(12) United States Patent
Betz

(10) Patent No.: US 12,103,491 B2
(45) Date of Patent: Oct. 1, 2024

(54) BELT SHAFT HOUSING, BELT SHAFT, BELT TENSIONER, AND METHOD FOR INSTALLING A BELT TENSIONER

(71) Applicant: ZF AUTOMOTIVE GERMANY GMBH, Alfdorf (DE)

(72) Inventor: Hans-Peter Betz, Böbingen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 533 days.

(21) Appl. No.: 17/291,776

(22) PCT Filed: Nov. 4, 2019

(86) PCT No.: PCT/EP2019/080038
§ 371 (c)(1),
(2) Date: May 6, 2021

(87) PCT Pub. No.: WO2020/094541
PCT Pub. Date: May 14, 2020

(65) Prior Publication Data
US 2022/0126782 A1 Apr. 28, 2022

(30) Foreign Application Priority Data
Nov. 9, 2018 (DE) ..................... 10 2018 128 033.5

(51) Int. Cl.
*B60R 22/34* (2006.01)
(52) U.S. Cl.
CPC ...... *B60R 22/34* (2013.01); *B60R 2022/3402* (2013.01); *B60R 2022/3427* (2013.01)
(58) Field of Classification Search
CPC ................ B60R 22/34; B60R 2022/34; B60R 22/3413; B60R 2022/468
See application file for complete search history.

(56) References Cited

U.S. PATENT DOCUMENTS

| 3,471,100 A | 10/1969 | Arcari |
| 3,537,666 A | 11/1970 | Lewis |
| (Continued) | | |

FOREIGN PATENT DOCUMENTS

| DE | 2013341 A1 | 9/1971 |
| DE | 3122774 A1 * | 4/1983 |
| (Continued) | | |

OTHER PUBLICATIONS

PCT International Search Report for corresponding International Application Serial No. PCT/EP2019/080038, mailed Dec. 18, 2019, pp. 1-6.

*Primary Examiner* — Amy R Weisberg
*Assistant Examiner* — Matthew D Lee
(74) *Attorney, Agent, or Firm* — Tarolli, Sundheim, Covell & Tummino LLP

(57) ABSTRACT

A belt shaft housing (40) for a belt shaft of a seatbelt system comprises a shaft holder (42) for holding the belt shaft, a securing component (48) including a retaining portion (88), and at least one fixing element (74) that is configured to fasten the belt shaft within the shaft holder (42). The securing component (48) is fastened to the shaft holder (42) such that it can adopt an assembly position and a securing position, wherein the fixing element (74) is released in the assembly position and is secured to the shaft holder (42) in the securing position. Further, a belt shaft including a webbing, a belt pin and a sleeve-shaped axle is provided. There is moreover provided a belt tensioner, especially an end fitting tensioner, comprising such belt shaft housing (40) and such belt shaft as well as a method for assembling such belt tensioner.

19 Claims, 9 Drawing Sheets

(56) References Cited

U.S. PATENT DOCUMENTS

| | | | |
|---|---|---|---|
| 5,340,046 A * | 8/1994 | Schroth | B60R 22/28 |
| | | | 280/805 |
| 5,647,553 A | 7/1997 | Smithson et al. | |
| 2001/0022330 A1* | 9/2001 | Mitsuo | B60R 22/44 |
| | | | 242/372 |
| 2014/0263808 A1* | 9/2014 | Wang | B60R 22/4633 |
| | | | 242/546 |
| 2014/0374527 A1* | 12/2014 | Betz | B60R 22/4628 |
| | | | 242/374 |
| 2015/0232062 A1* | 8/2015 | Scheuermann | B60R 22/34 |
| | | | 242/407 |
| 2017/0106832 A1* | 4/2017 | Clark | B60R 22/405 |
| 2017/0341625 A1* | 11/2017 | Jaradi | B60R 22/3413 |
| 2018/0065594 A1* | 3/2018 | Burrow | B60R 22/34 |

FOREIGN PATENT DOCUMENTS

| | | | | |
|---|---|---|---|---|
| DE | 3711537 | A1 | 11/1988 | |
| DE | 4135111 | A1 | 4/1993 | |
| DE | 102006043569 | B3 | 1/2008 | |
| DE | 102012018263 | A1 | 3/2014 | |
| DE | 102015010788 | A1 | 2/2017 | |
| EP | 0140553 | A2 * | 5/1985 | |
| EP | 1728693 | A2 | 12/2006 | |
| JP | PS5382132 | U | 7/1978 | |
| JP | 3607114 | B2 | 1/2005 | |
| WO | WO-9309009 | A1 * | 5/1993 | B60R 22/34 |

* cited by examiner

BELT SHAFT HOUSING, BELT SHAFT, BELT TENSIONER, AND METHOD FOR INSTALLING A BELT TENSIONER

RELATED APPLICATIONS

This application corresponds to PCT/EP2019/080038 filed Nov. 4, 2019, which claims the benefit of German Application No. 10 2018 128 033.5 filed Nov. 9, 2018, the subject matter of which are incorporated herein by reference in their entirety.

BACKGROUND OF THE INVENTION

The invention relates to a belt shaft housing and a belt shaft for a seatbelt system, a belt tensioner comprising such belt shaft housing and such belt shaft as well as a method for assembling such belt tensioner.

Seatbelt systems and belt tensioners of this type are generally known already from automotive engineering. In this context, in the case of activation of the belt tensioner, the end of a three-point seatbelt that is actually fixed and usually connected to the seat frame or the vehicle body is tightened to ensure tensioning of the entire webbing. In prior art, both linearly operating and rotatory belt tensioners are described. In the rotatory belt tensioners, the webbing end is connected to a belt shaft which is rotationally driven upon activation of the belt tensioner so as to wind webbing onto the belt shaft. The belt shaft is rotatably supported within the belt shaft housing for this purpose.

In order to guarantee safe bearing of the belt shaft within the belt shaft housing which at the same time withstands the high loads in the case of restraint, common belt tensioners exhibit a complex structure and require high mounting expenditure.

SUMMARY OF THE INVENTION

It is the object of the invention to provide a belt shaft housing, a belt shaft and a belt tensioner which can be easily mounted with little effort. It is another object of the invention to provide a method by means of which such belt tensioner can be quickly and reliably assembled.

For achieving the object, a belt shaft housing for a belt shaft is provided for a seatbelt system. The belt shaft housing includes a shaft holder for holding the belt shaft, a securing component comprising a retaining portion, and at least one fixing element that is configured to fasten the belt shaft within the shaft holder. The securing component is fastened to the shaft holder so that it can adopt an assembly position and a securing position. The fixing element is released in the assembly position and is secured to the shaft holder in the securing position, in particular by the retaining portion blocking the fixing element in an axial direction. This design of the belt shaft housing helps provide a simple, reliable and safe assembly of the belt shaft within the shaft holder.

The axial direction in the present case relates to the axial direction of the belt shaft.

Accordingly, the fixing element may be formed, especially integrally, of a plastic material, thus allowing for especially cost-effective manufacture of the fixing element.

In addition, or alternatively, the shaft holder, in particular as a stamped and bent part, can be made from steel. In this way, the shaft holder can be manufactured to be especially stable at low costs.

In one embodiment, the securing component is adjustable in a direction transversely to the provided axis of rotation of the belt shaft from the assembly position to the securing position. Thus, the securing component can be arranged to be readily accessible and, consequently, to be easily adjustable, which helps facilitate the assembly.

In another embodiment, the fixing element extends coaxially to the axis of rotation. In particular, the fixing element is a fixing bolt that engages in the belt shaft in the axial direction. In this way, the belt shaft can be fastened easily and reliably within the shaft holder.

The shaft holder may be provided to have a first coupling unit and a second coupling unit opposed in the axial direction for the belt shaft. The ends of the belt shaft are supported in the coupling units, with the at least one fixing element fastening one of the ends of the belt shaft in the corresponding coupling unit. This ensures safe bearing and stable fastening of the belt shaft within the shaft holder.

According to one embodiment of the belt shaft housing, two fixing elements are provided each of which is associated with one of the ends of the belt shaft.

It is advantageous when the first coupling unit and/or the second coupling unit include(s) an opening in which the fixing element is at least partially disposed and which is at least partially, especially completely, closed by the securing component in the securing position. In this way, the securing component may block the opening in the securing position so that the fixing element cannot slip through the opening out of the coupling unit, i.e., the securing component blocks the fixing element in at least one direction.

According to another embodiment, the belt shaft housing comprises a fastening element by means of which the securing component can be fixed to the shaft holder in the securing position. Thus, the securing component can be prevented from detaching from the securing position.

Moreover, the shaft holder and the securing component can be provided to comprise locking means through which the securing component can be locked to the shaft holder. In particular, the securing component can be locked to the shaft holder in the assembly position and/or the securing position. By retaining the securing component in predetermined positions by the locking means, easy and reliable assembly can be ensured.

In accordance with the invention, for achieving the aforementioned object also a belt shaft having a webbing, a belt pin and a sleeve-shaped axle is provided, which axle has a C profile, i.e., the axle is tubular and has a slit-shaped opening in the axial direction. At one end of the webbing, a loop is formed through which the belt pin extends at least in portions. The loop is received with the belt pin at least in portions in the axle. The slit-shaped opening in the axle is narrower in the circumferential direction than the diameter of the belt pin so that the latter cannot slip out of the axle through the opening in the radial direction. Hence, the loop extends in the clearance between the belt pin and the sleeve-shaped axle, thus causing the webbing to be safely fastened on the sleeve-shaped axle and, resp., the belt pin in the radial direction relative to the axis of rotation.

In one embodiment, the axial length of the belt pin is smaller than the axial length of the sleeve-shaped axle. Especially, the belt pin can be completely received in the sleeve-shaped axle. Thus, a cavity that may be provided for safe and easy fastening of the belt shaft on the shaft holder remains in the sleeve-shaped axle, especially at both axial ends of the axle.

According to the invention, for achieving the aforementioned object also a belt tensioner, especially an end fitting tensioner, is provided with a belt shaft housing according to the invention and a belt shaft according to the invention. The belt shaft is accommodated in the shaft holder and is safely fastened by means of the fixing element. This configuration allows the belt shaft to be quickly and reliably assembled to the shaft holder.

Preferably, the first coupling unit and/or the second coupling unit include an, especially C-shaped, receiving portion formed complementarily to the sleeve-shaped axle of the belt shaft. In this way, the belt shaft can be inserted into the shaft holder in a safe and accurately fitting manner, thus ensuring quick and reliable assembly.

The receiving portion or receiving portions may be provided to include a radially inwardly extending extension that engages in the sleeve-shaped axle and thus fixes the latter in the circumferential direction to the respective coupling unit. This means that the belt shaft is coupled to the corresponding receiving portion in a torque-transmitting manner. In this way, the belt shaft can be fastened, in one working step, to the shaft holder and can be coupled to the receiving portions in a torque-transmitting manner so that, in the case of restraint, the belt shaft can be driven via the receiving portions to retract the webbing.

In accordance with the invention, for achieving the aforementioned object also a method for assembling a belt tensioner according to the invention is provided with the following sequence of steps:
  providing the shaft holder including the securing component which is in the assembly position,
  inserting the belt shaft into the shaft holder,
  inserting the fixing element in the axial direction into the sleeve-shaped axle of the belt shaft, and
  shifting the securing component from the assembly position to the securing position, thus causing the fixing bolt to be secured.

In this way, the belt tensioner can be safely and reliably assembled by few steps.

According to one embodiment, after shifting the securing component into the securing position the securing component is fixed to the shaft holder by means of the fastening element. Hence, the securing component is prevented from being released from the securing position.

According to another embodiment, the fixation is carried out by means of the fastening element in a load-controlled manner, especially in a torque-controlled manner, so that such information can be registered by a controller and the assembly can be recorded as being correctly completed, when a particular threshold indicating correct fastening is reached. In this way, assembly errors can be avoided and thus the quality control can be improved.

BRIEF DESCRIPTION OF THE DRAWINGS

Further advantages and features will be evident from the following description in conjunction with the attached drawings, wherein.

DESCRIPTION

Figure 1:
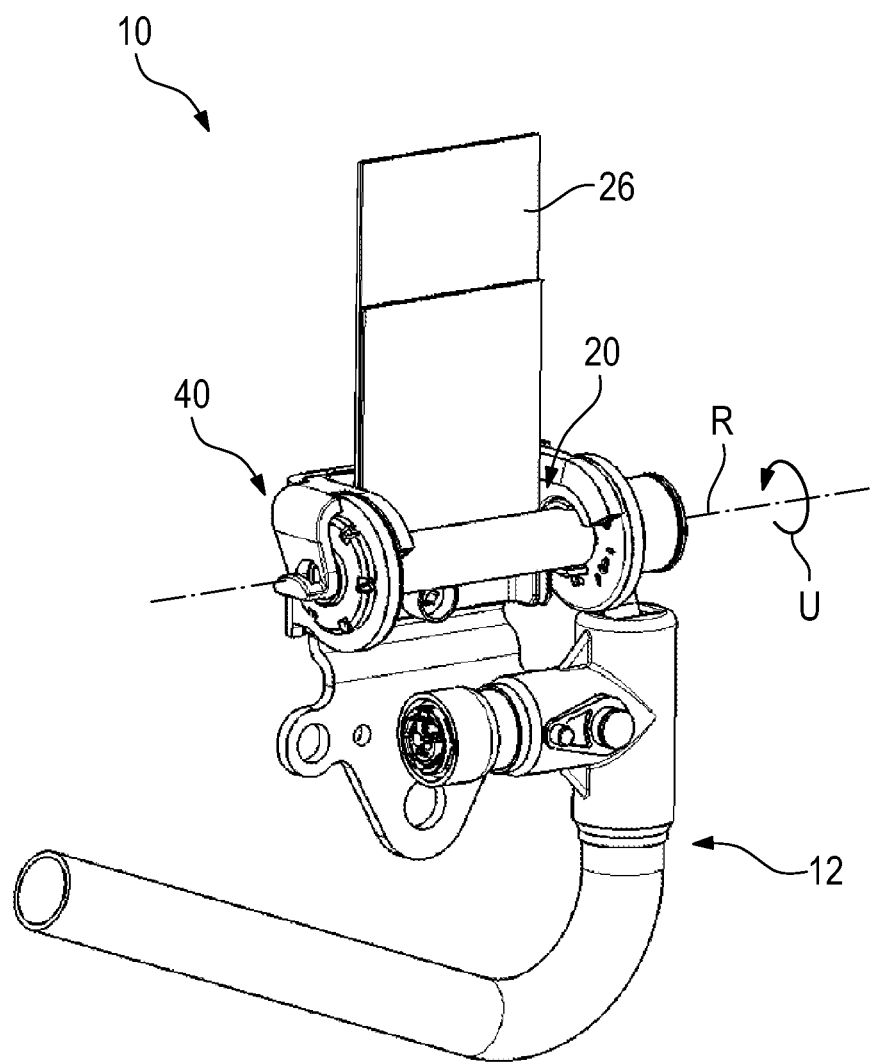
FIG. 1 shows a perspective view of a belt tensioner according to the invention comprising a belt shaft housing according to the invention and a belt shaft according to the invention.

FIG. 1 illustrates a belt tensioner 10 for a seatbelt system.

The seatbelt system is a three-point seatbelt in a motor vehicle. Basically, the belt tensioner 10 is suited for any seatbelt systems, however.

The belt tensioner 10 includes a belt shaft 20 that is rotatably supported about an axis of rotation R within a belt shaft housing 40.

For driving the belt shaft 20 in the case of restraint such as during a collision, the belt tensioner 10 includes a belt tensioner drive 12.

Belt tensioner drives 12 are sufficiently known in various embodiments. Therefore, a more detailed description of the structure and the functioning of the belt tensioner drive 12 shall be dispensed with here.

Figure 2:
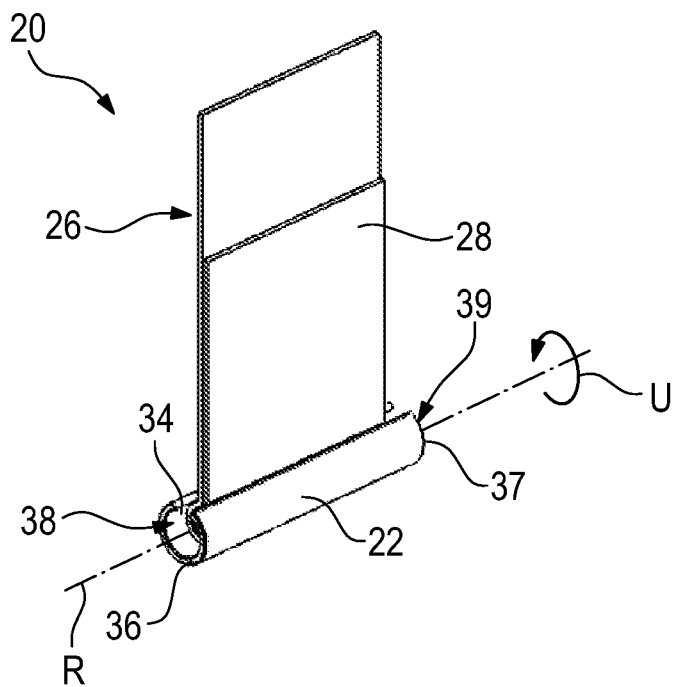
FIG. 2 shows a perspective view of the belt shaft from FIG. 1.
Figure 3:
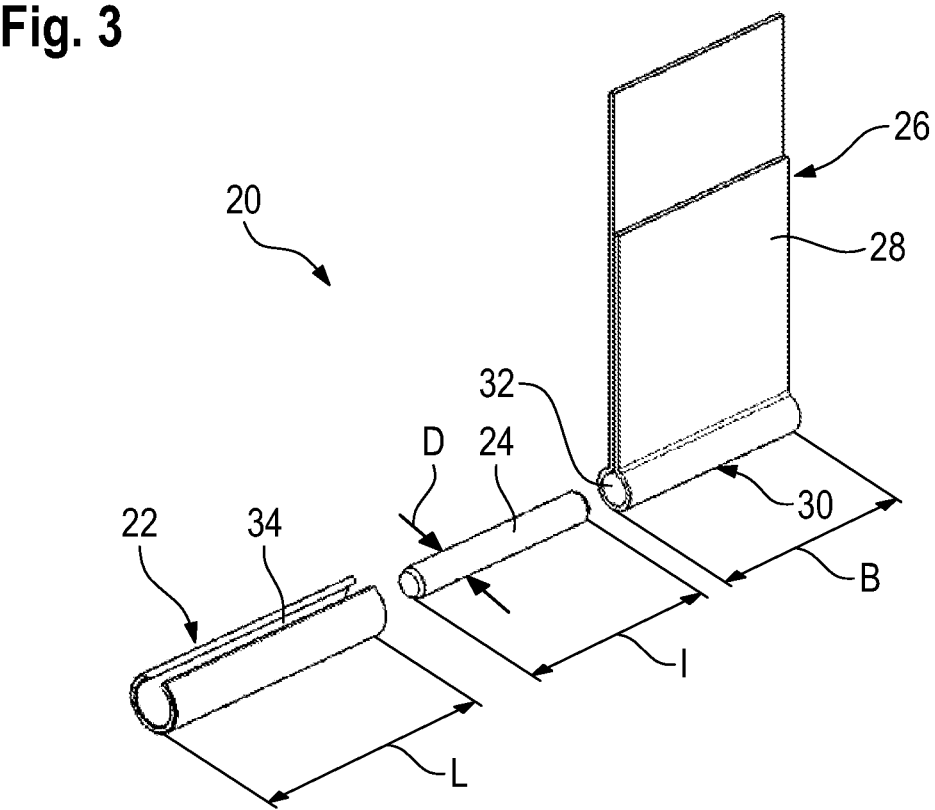
FIG. 3 shows an exploded view of the belt shaft from FIG. 1.

FIG. 2 illustrates the belt shaft 20 comprising a sleeve-shaped axle 22 in which a cylindrical belt pin 24 (see FIG. 3) is accommodated. Moreover, the belt shaft 20 includes a webbing 26.

The sleeve-shaped axle 22 in cross-section has a C-section, i.e., it is circularly tube-shaped and has an axial slit 34 of a width b. The axle 22 has a length L in the axial direction.

The belt pin 24 is circularly cylindrical with a diameter D and an axial length l. As a matter of course, the belt pin 24 may take any other shape, wherein a complementary design of the belt pin 24 to the axle 22 offers the advantage that in the case of restraint the forces are distributed more evenly across the components and the belt shaft 20 thus withstands higher loads.

In relative proportion, the length L of the axle 22 is larger than the axial length l of the belt pin 24.

The width b of the slit 34 of the axle 22 is smaller than the diameter D of the belt pin 24.

The sleeve-shaped axle 22 and the belt pin 24 are made from steel having a strength that meets the standard requirement made to seatbelt systems of 15 kN.

As a matter of course, the axle 22 and/or the belt pin 24 may be made from any material having sufficiently high strength.

The webbing 26 in the shown embodiment is formed by one end of the belt of the seatbelt system and thus is coupled thereto. In an alternative embodiment, the webbing 26 may be coupled in a different manner to the belt of the seatbelt system to tension the same in the case of restraint.

With respect to the belt pin 24, the webbing 26 has a width B corresponding to the length l of the belt pin 24.

The webbing 26 is sewn up in an overlapping area 28 and, accordingly, forms an end 30 having a loop 32. In addition, or alternatively, the webbing 26 may be connected to itself in the overlapping area 28 in a different way, such as by adhesive bonding or welding.

The loop 32 is received in the sleeve-shaped axle 22, with the webbing 26 extending through the slit 34.

The belt pin 24 is disposed in the loop 32 of the webbing 26 so that the webbing 26 extends around the belt pin 24 in the circumferential direction U in the sleeve-shaped axle 22.

The belt pin 24 and the loop 32 thus are completely received in the axle 22.

In an alternative embodiment, especially in which the loop 32 is significantly wider than the circumference of the belt pin 24, the loop 32 can extend out of the axle 22 via the slit 34 in the radial direction.

The overlapping area 28 preferably extends toward the axle 22, especially into the slit 34, which renders the loop 32 so narrow that the belt pin 24 is received substantially free from play in the loop 32. This offers the advantage that the assembly of the belt shaft 20 is facilitated as the belt pin 24 can be inserted, together with the webbing 26, into the axle 22 without the risk of the belt pin 24 slipping out of the loop 32. Furthermore, the narrow loop 32 offers the advantage that, during assembly, the webbing 26 can be threaded more easily with the overlapping area 28 into the slit 34 than this would be the case for a wide loop 32 which extends out of the axle 22 in the radial direction.

Preferably, the loop 32 is received with the belt pin 24 free from play or with little play only in the sleeve-shaped axle 22. On the one hand, the loop 32 is thus prevented from slipping within the axle 22, which facilitates the assembly of the belt tensioner 10, as is also illustrated concerning the assembly method. On the other hand, forces acting in the case of restraint can be better absorbed by the belt shaft 20.

The belt pin 24 and the loop 32 are arranged in the center of the axle 22 in the axial direction so that the belt shaft 20 includes, at the axial ends 36, 37 of the axle 22, two recesses 38, 39 formed by the portions of the axle 22 which have no belt pin 24.

In this way, the webbing 26 is safely fastened in the sleeve-shaped axle 22 so that the belt shaft 20 also withstands the high loads which may occur in a case of restraint.

Furthermore, the webbing 26 is hereby coupled to the axle 22 such that the webbing 26 winds onto the axle 22, when the axle 22 rotates about the axis of rotation R in or against the circumferential direction U. This means that the axle 22 forms a reel for the webbing 26.

Figure 4:
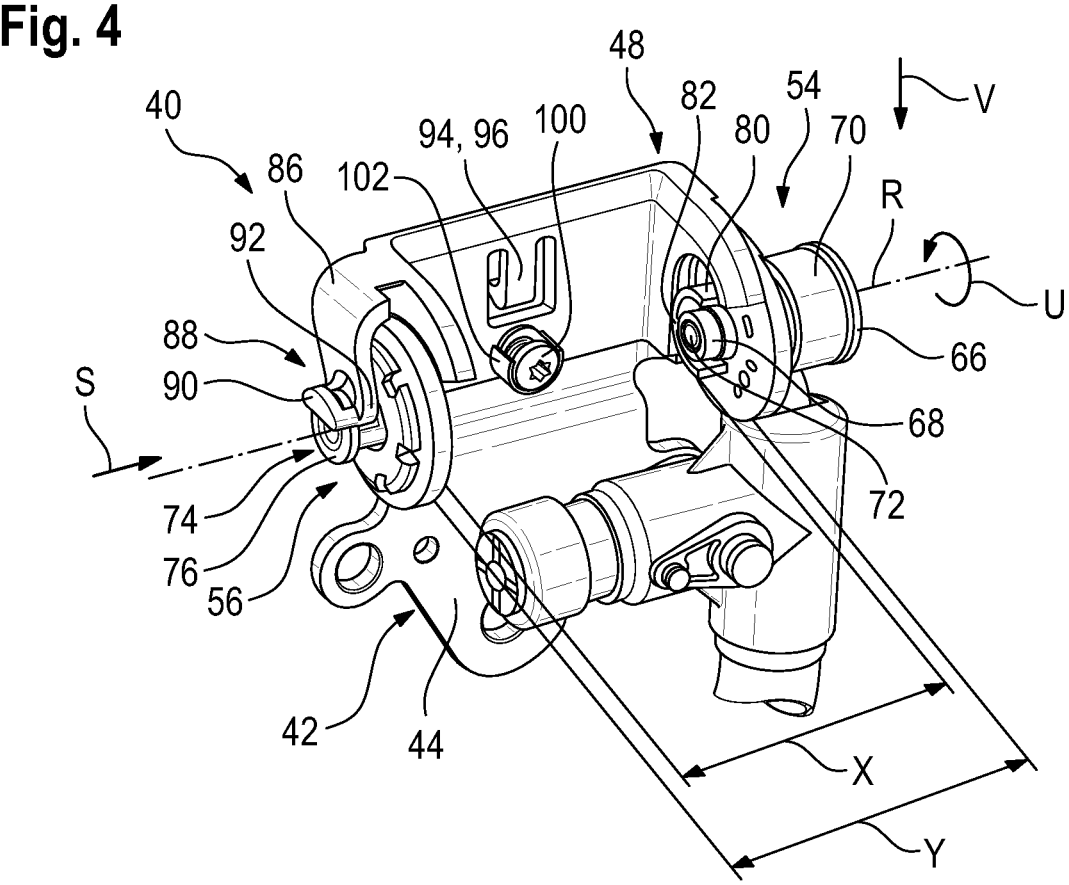
FIG. 4 shows a perspective view of the belt shaft housing from FIG. 1.
Figure 5:
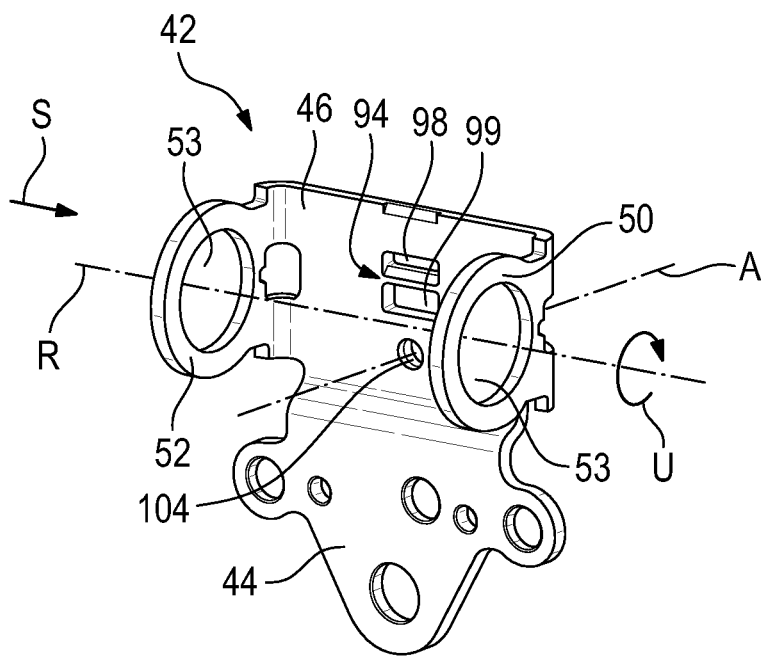
FIG. 5 shows a detailed view of a coupling unit of the belt shaft housing from FIG. 1.

FIG. 4 illustrates the belt shaft housing 40 which includes a shaft holder 42 having a lower portion 44 and an upper portion 46 as well as a securing component 48. The shaft holder is separately illustrated in FIG. 5. The shaft holder 42 is a one-piece stamped and bent part made from steel.

The lower portion 44 forms a fitting provided to fasten the belt tensioner 10, for example on a seat which the seatbelt system is associated with.

The upper portion 46 is provided for holding the belt shaft 20 and, to this end, includes a first mount 50 and a second mount 52 which are disposed opposite to each other coaxially on the axis of rotation R.

Each of the first and second mounts 50, 52 is formed by a ring having a circular through-hole 53.

The belt shaft housing 40 includes a first coupling unit 54 received in the first mount 50 and a second coupling unit 56 received in the second mount 52 by means of which the belt shaft 20 is supported in the first and second mounts 50, 52.

Figure 6:
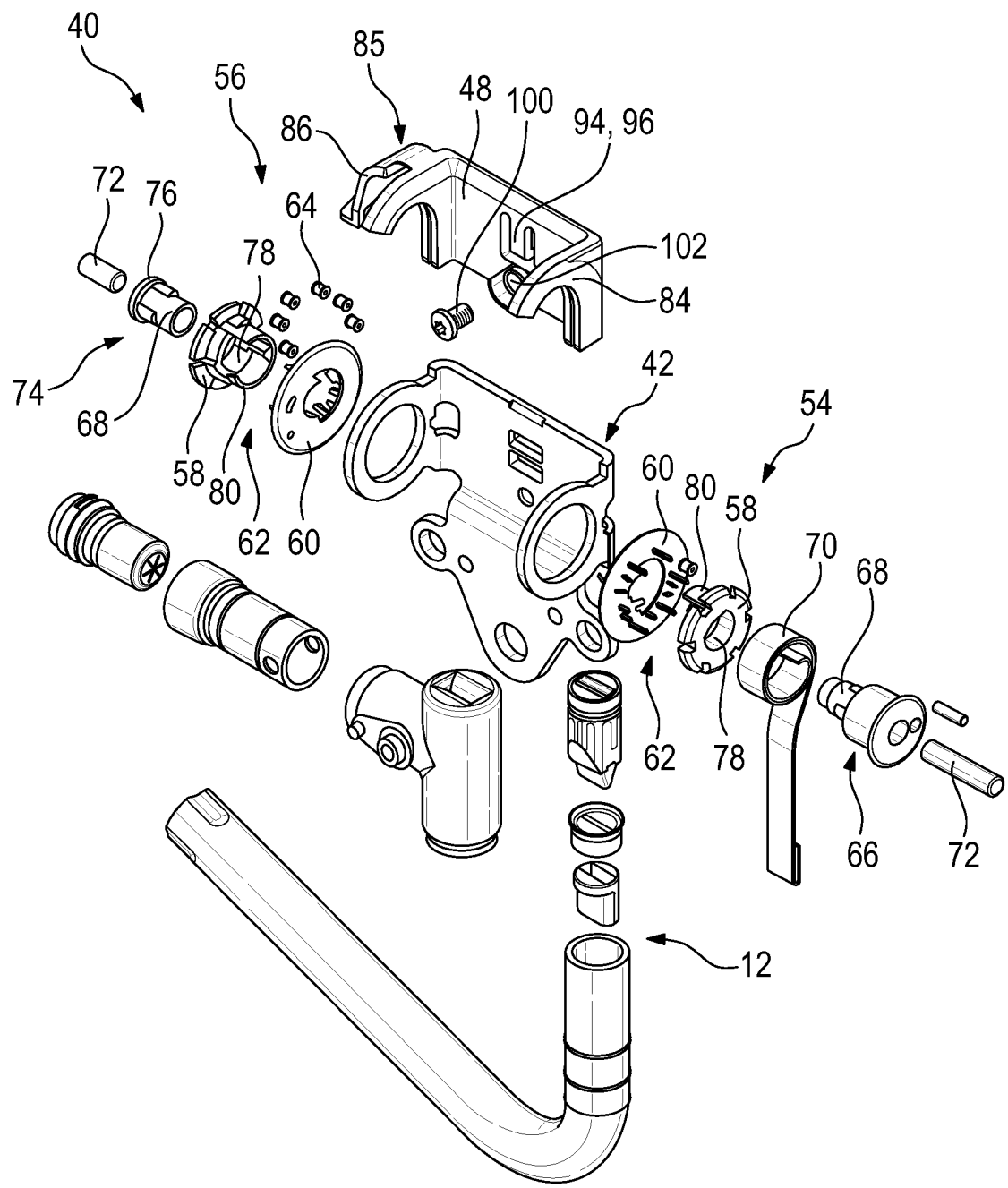
FIG. 6 shows an exploded view of the belt tensioner from FIG. 1 without the belt shaft.

As illustrated in FIG. 6, the first coupling unit 54 comprises a first sleeve-shaped blocking element 58 and a cage disk 60 which together form a cage 62 for bearing elements 64.

The first coupling unit 54 further comprises a reel 66 having a shaft-type bearing portion 68 which is connected to the blocking element 58 in a torque-transmitting manner.

The bearing portion 68 extends coaxially to the axis of rotation R.

A tension element 70 which is coupled to the belt tensioner drive 12 such that the reel 66 is driven, in the case of restraint, by the belt tensioner drive 12 via the tension element 70 in the circumferential direction U is wound onto the reel 66.

A pin 72 which is provided to reinforce the reel 66, especially the shaft-type bearing portion 68, is coaxially received in the reel 66.

The reel 66 is made from plastic material and the pin 72 is made from steel.

The second coupling unit 56 includes, analogously to the first coupling unit 54, a cage 62 consisting of a sleeve-shaped blocking element 58 and of a cage disk 60. In contrast to the first coupling unit 54, a bolt-shaped fixing element 74 is provided rather than a reel 66.

The fixing element 74 comprises a further pin 72, and the fixing element 74 includes a bearing portion 68 at one axial end and a collar 76 at the axial end opposed to the bearing portion 68.

The fixing element 74 extends through the central opening 78 of the sleeve-shaped blocking element 58 and in the latter is slidably supported in the axial direction, with the collar 76 forming an axial stop.

Accordingly, the fixing element 74 is coupled to the blocking element 58 in a torque-transmitting manner. In an alternative embodiment, the fixing element 74 may be coupled to the blocking element 58 in a not torque-transmitting manner, as, in contrast to the reel 66, no torque has to be transmitted to the blocking element 58 via the fixing element 74.

The bearing portion 68 of the fixing element 74 extends coaxially to the axis of rotation R.

Analogously to the reel 66, the fixing element 74 is made from plastic material, and the pin 72 made from steel is provided to reinforce the fixing element 74, especially the shaft-type bearing portion 68.

In an alternative embodiment, the fixing element 74 and the reel 66 may substantially exhibit any design, especially may be made from any material and/or integrally, i.e., without a separate pin 72 for reinforcement. As a matter of course, the reel 66 and the fixing element 74 may be designed differently from each other.

Each of the coupling units 54, 56 is rotatably supported about the axis of rotation R in the respective mount 50, 52.

The bearing is provided by the bearing elements 64 which are arranged in the circumferential direction U between the respective coupling unit 54, 56 and the wall portion of the respective mount 50, 52 abutting on the respective through-hole 53.

In FIG. 6, the bearing elements 64 are shown for the second coupling unit 56 only, but corresponding bearing elements 64 are analogously provided for the first coupling unit 54.

Figure 7:
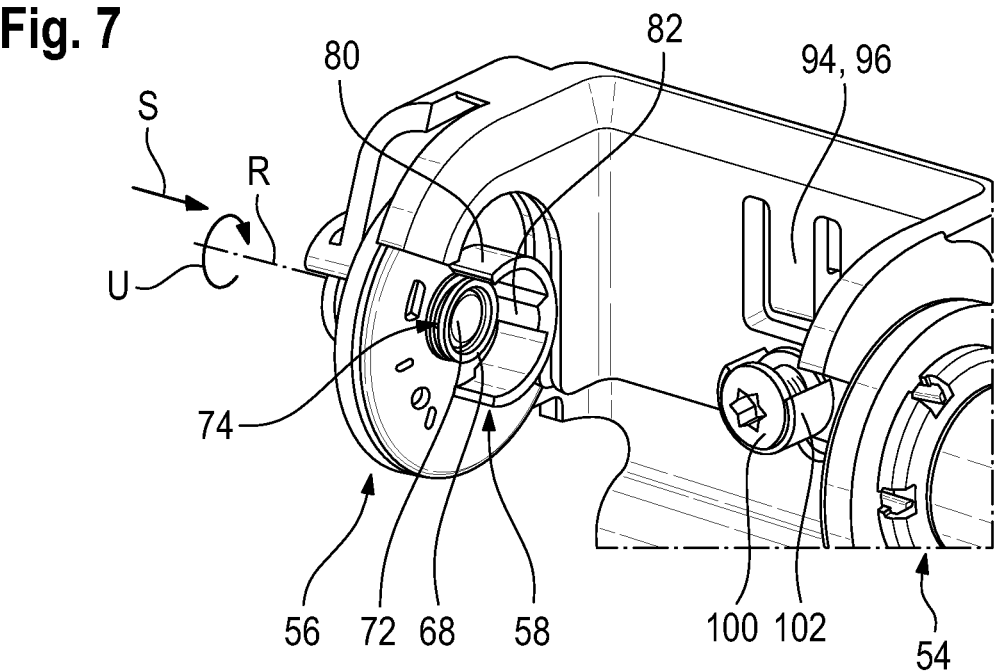
FIG. 7 shows a perspective view of a shaft holder of the belt shaft housing from FIG. 1, each of FIGS. 8 and 9 shows a perspective view of a securing component of the belt shaft housing from FIG. 1, each of FIGS. 10 and 11 shows a perspective view of the belt shaft housing from FIG. 1 with the securing component being in the assembly position.

As can be seen from FIG. 7, the blocking element 58 of the second coupling unit 56 includes a C-shaped receiving portion 80 extending in the axial direction to the first coupling unit 54 which, in the position of the second coupling unit 56 shown in FIG. 7, is opened away from the wave holder 42.

The C-shaped receiving portion 80 has an opening angle of 180°, i.e., it extends in the circumferential direction U only half around the axis of rotation R.

Of course, in an alternative embodiment, the opening angle may also be larger, i.e., the C-shaped receiving portion 80 may be smaller in the circumferential direction U. However, an opening angle of 180° is advantageous, as thus the bearing surface of the axle 22 on the receiving portion 80 is especially large without impairing the assembly.

In an alternative embodiment, the opening angle of the C-shaped receiving portion 80 may be somewhat smaller than 180°, such as 175° or 170°, i.e., the C-shaped receiving portion extends in the circumferential direction U more than half around the axis of rotation R. Accordingly, the C-shaped receiving portion 80 must be flexible at least in portions so that the C-shaped receiving portion 80 can elastically deform, when the axle 22 is inserted into the receiving portion 80 in a direction radial to the axis of rotation R. In this case, when inserting the axle 22, the resistance of the receiving portion 80 must be overcome by a certain pressure, but after that the axle 22 is received captively in the radial direction in the receiving portion 80, whereby the assembly is facilitated.

The C-shaped receiving portion 80 includes a central extension 82 which is arranged centrally in the curve of the C and which extends radially inwardly.

The receiving portion 80 is complementary to the axle 22 so that the axle 22 can be supported free from play within the receiving portion 80. This means that the receiving portion 80 has an inner diameter corresponding to the outer diameter of the axle 22.

Further, the extension 82 has a width in the circumferential direction U that corresponds to the width b of the slit 34.

The blocking element 58 of the first coupling unit 54 includes, analogously to the blocking element 58 of the second coupling unit 56, a C-shaped receiving portion 80 extending in the axial direction to the second coupling unit 56 (see FIG. 4).

The blocking elements 58 of the first coupling unit 54 and the second coupling unit 56 are designed identically to each other.

As a matter of course, the blocking element 58 of the first coupling unit 54 may be designed differently from the blocking element 58 of the second coupling unit 56, in particular in that the C-shaped receiving portions 80 are designed differently from each other.

For example, the blocking element 58 of the first coupling unit 54 may substantially consist only of the extension 82 to couple the axle 22 to the coupling unit 54 in a torque-transmitting manner, as the receiving portion 80 of the first coupling unit 54, in contrast to the receiving portion 80 of the second coupling unit 56, does not have the function of a stop during assembly.

The opening 78 of each of the blocking elements 58 extends coaxially to the axis of rotation R.

The axial distance X between the C-shaped receiving portion 80 of the blocking element 58 of the first coupling unit 54 and the C-shaped receiving portion 80 of the blocking element 58 of the second coupling unit 56 is smaller than the axial length L of the axle 22.

The axial distance Y between the cage disk 60 of the first coupling unit 54 and the cage disk 60 of the second coupling unit 56 corresponds to the axial length L of the axle 22, thus causing the axle 22 in the belt shaft housing 40 to be received free from play in the axial direction.

In an alternative embodiment, the axial length L of the axle 22 may be smaller than the axial distance Y between the two cage disks 60.

In the assembled state, the bearing portion 68 of the reel 66 extends in the axial direction into the C-shaped receiving portion 80 of the blocking element 58 of the first coupling unit 54.

The reel 66 and, thus, the bearing portion 68 of the reel 66 are fixed to the shaft holder 42 in the axial direction.

The axle 22 is coupled via the extension 82 to the blocking element 58 in a torque-transmitting manner.

The fixing element 74 and, thus, the bearing portion 68 of the fixing element 74 are adjustable in the axial direction between a first position in which the bearing portion 68 substantially does not protrude in the axial direction into the C-shaped receiving portion 80 of the blocking element 58 of the second coupling unit 56 (see FIG. 7) and a second position in which the bearing portion 68 extends at least in portions into the C-shaped receiving portion 80 of the blocking element 58 of the second coupling unit 56.

In this context, by the term substantially does not protrude in the axial direction into the C-shaped receiving portion 80 a position is to be understood in which the bearing portion 68 of the fixing element 74 extends into the C-shaped receiving portion 80 of the blocking element 58 of the second coupling unit 56 at most so far that hereby the insertion of the belt shaft 20 into the belt shaft housing 40 is not prevented or obstructed during assembly.

The securing component 48 (see FIG. 4) in portions is complementary to the shaft holder 42 and is adjustable between an assembly position and a securing position in an adjusting direction V transversely to the axis of rotation R at the upper portion 46 of the shaft holder 42.

Accordingly, the securing component 48 is configured so that it can be attached, in the adjusting direction V, onto the upper portion 46 of the shaft holder 42 and, during adjustment between the assembly position and the securing position, is guided by the shaft holder 42 so that the securing component 48 is movable only in and against the adjusting direction V relative to the shaft holder 42.

The adjusting direction V extends in parallel to the plane in which the upper portion 46 extends, as well as perpendicularly to the axis of rotation R.

The securing component 48 is an injection molded part made from plastic material.

Figure 8:
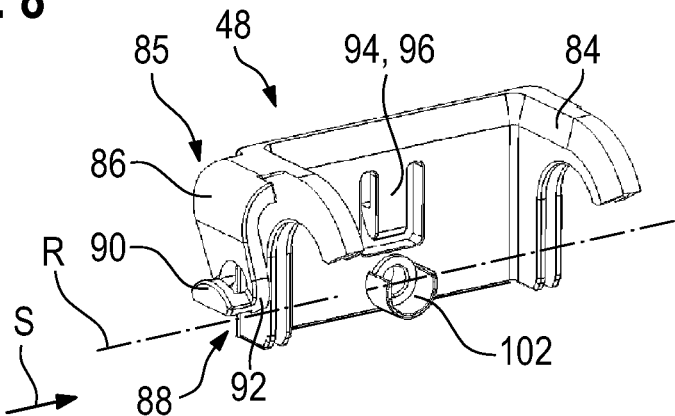
Figure 9:
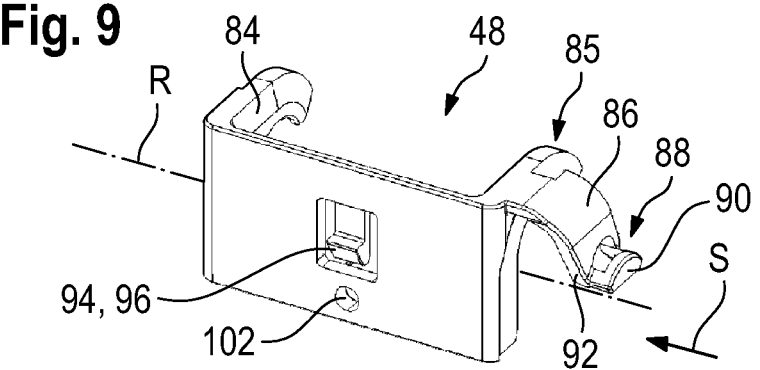

The securing component 48 includes, as can be seen from FIGS. 8 and 9, at one axial end a first supporting portion 84 and at the opposite axial end a second supporting portion 85 having a retainer 86.

The first supporting portion 84 is associated with the first mount 50 and the second supporting portion 85 is associated with the second mount 52 of the shaft holder 42, causing the securing component 48 to be held in the axial direction by the supporting portions 84, 85 between the first and second mounts 50, 52.

The retainer 86 is formed by a tab disposed on the axially outer side of the supporting portion 85 and extending to the axis of rotation R. In this way, the second coupling unit 56 is disposed in portions between the second supporting portion 85 and the retainer 86.

The retainer 86 includes a retaining portion 88 with a first step 90 and a second step 92 which are offset against each other in the axial direction S. The second step 92 is closer to the supporting portion 85 than the first step 90.

In the assembly position, the first step 90 extends, when viewed in the axial direction S, in portions over the opening 78 of the blocking element 58 of the second coupling unit 56, thus causing the first step 90 to block the fixing element 74 in the axial direction such that, although the fixing element 74 is adjustable between the first position and the second position, it cannot fall out of the opening 78 of the blocking element 58.

In the securing position, the second step 92 extends, when viewed in the axial direction S, in portions over the opening 78 of the blocking element 58 of the second coupling unit 56, thus causing the second step 92 to fix the fixing element 74 in the axial direction in the second position.

As a matter of course, when viewed in the axial direction S, the first step 90 and/or the second step 92 also can extend completely over the opening 78 or only over the collar 76 of the fixing element 74, as long as it is ensured that the fixing element 74 is blocked in the respective positions by the retaining portion 88.

In addition, or alternatively, in one embodiment the retaining portion 88 may be provided to include only the second step 92 which fixes the fixing element 74 in the second position in the axial direction. In this case, the opening 78 is completely released by the retaining portion 88 in the assembly position, when viewed in the axial direction S.

The retainer 86 is configured to be flexible and applies a force to the fixing element 74 in the securing position in the axial direction. Said press-fit ensures the fixing element 74 to be fastened and thus secured in the securing position free from play in the axial direction.

In order to retain the securing component 48 on the shaft holder 42 in the assembly position and the securing position, interacting locking means 94 are provided on the securing component 48 and on the shaft holder 42.

Figure 20:
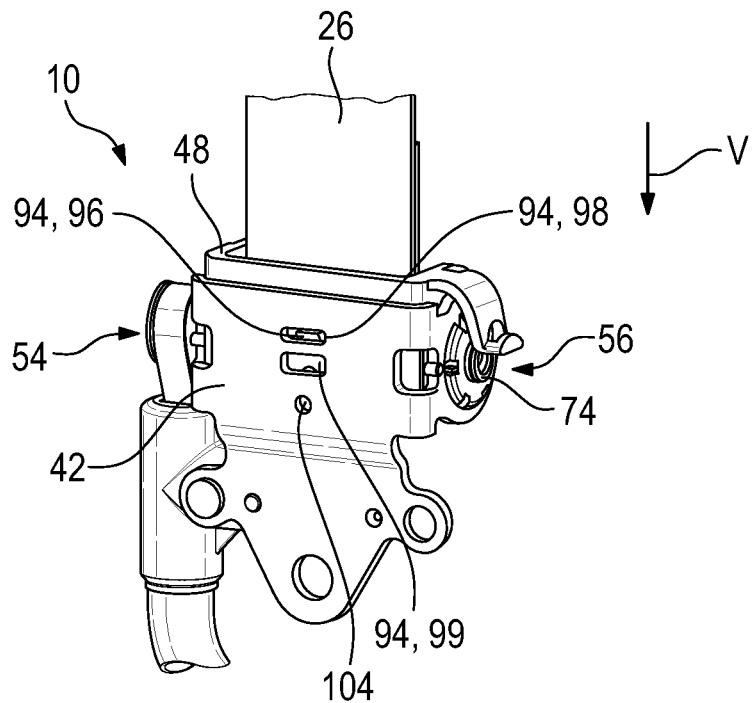
FIG. 20 shows a perspective view of the belt tensioner from FIG. 1 with the securing component being in the assembly position.
Figure 21:
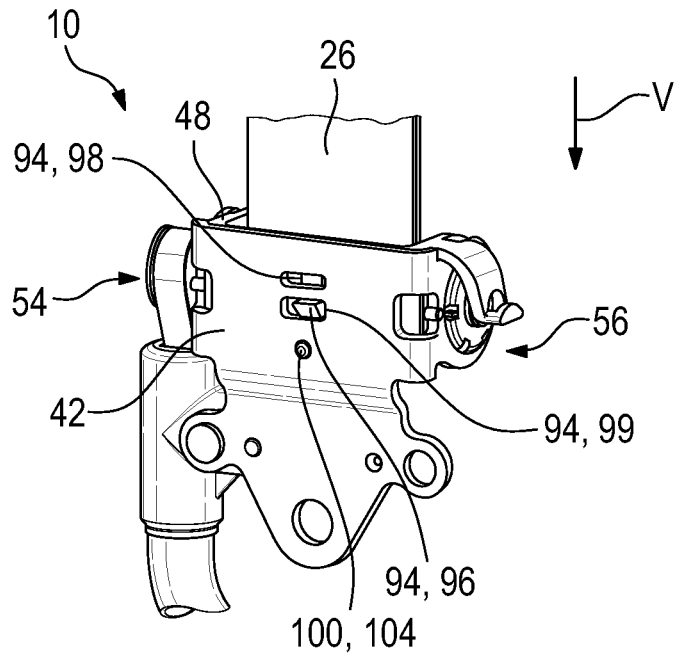
FIG. 21 shows a perspective view of the belt tensioner from FIG. 1 with the securing component being in the securing position.

The securing component 48 includes a detent hook 96, and the shaft holder 42 includes two detent recesses 98, 99 opposed to the detent hook 96, with one detent recess 98 being associated with the assembly position (see FIG. 20) and one detent recess 99 being associated with the securing position (see FIG. 21).

The locking means 94 are configured such that the securing component 48 will lock with the shaft holder 42 both in the assembly position and in the securing position. In this way, the securing component 48 is captively fastened within the shaft holder 42 and can be adjusted in a defined manner from the assembly position to the securing position.

Accordingly, the detent hook 96 locks the securing component 48 in the securing position and, thus, prevents the securing component 48 from slipping into the assembly position. In order to adjust the securing component 48 from the securing position to the assembly position, at first the detent hook 96 needs to be released, for example by pressing the detent hook 96 out of the detent recess 99 using a tool.

Alternatively, the locking means can be configured so that the securing component 48 can be adjusted from one position to the other without the securing component 48 fixedly locking at the shaft holder, for example by providing appropriate chamfers at the detent hook 96 and/or the detent recesses 98, 99.

The belt shaft housing 40 further comprises a fastener 100 (see FIG. 5) in the form of a screw which is fastened in a fastener mount 102 in the form of a corresponding through-hole in the securing component 48.

The screw 100 is partly screwed into the securing component 48 so that it is positively and thus captively pre-assembled.

The shaft holder 42 includes a core hole 104 (see FIG. 5) having a female thread corresponding to the screw 100 which is provided such that it is arranged in the securing position to be coaxially opposed to the fastener mount 102 so that the securing component 48 can be screwed with the shaft holder 42 by means of the screw 100.

The axis A along which the core hole 104 extends and the axis of rotation R are arranged askew relative to each other and have a distance that is larger than half the outer diameter of the axle 22. In this way, the fastener 100 is ensured to be easily reachable when the axle 22 is inserted for fixing the securing component 48 on the shaft holder 42. In the present case, this means that the screw 100 can be screwed into the core hole 104, for example by a screwdriver, without the axle 22 substantially obstructing the screwing.

In the completely mounted state, the belt shaft 20 in the belt tensioner 10 is rotatably supported about the axis of rotation R in the belt shaft housing 40 by means of the coupling units 54, 56. Accordingly, the axial end 37 of the axle 22 is received in the C-shaped receiving portion 80 of the first coupling unit 54, the bearing portion 68 of the reel 66 extending into the recess 39 of the axle 22.

Furthermore, the axial end 36 of the axle 22 is received in the C-shaped receiving portion 80 of the second coupling unit 56 and the fixing element 74 is disposed in the second position so that the bearing portion 68 of the fixing element 74 extends into the recess 38 of the axle 22.

The securing component 48 is in the securing position, thus causing the fixing element 74 to be secured in the second position. Furthermore, the securing component 48 is fastened to the shaft holder 42 via the fastener 100, thus causing the securing component 48 to be secured in the securing position.

By way of FIGS. 10 to 19, hereinafter a method for assembling the belt tensioner 10 will be described in which the belt shaft 20 is fastened in the belt shaft housing 40, with the belt shaft 20 and the belt shaft housing 40 being preassembled already as subassemblies.

Figure 10:
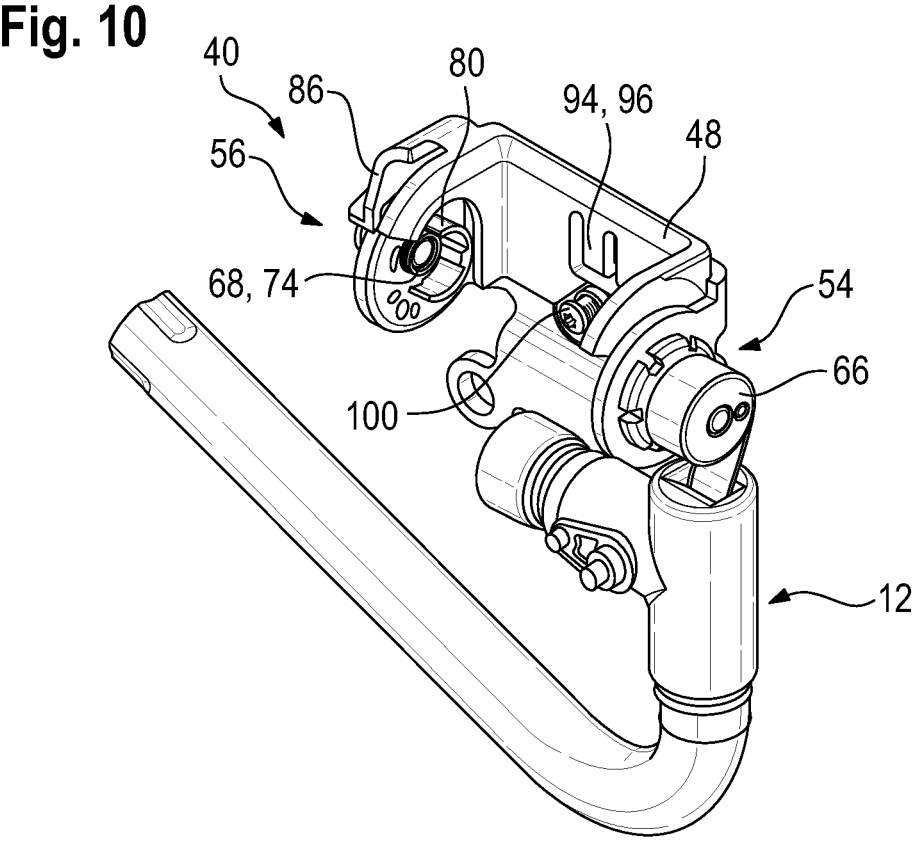
Figure 11:
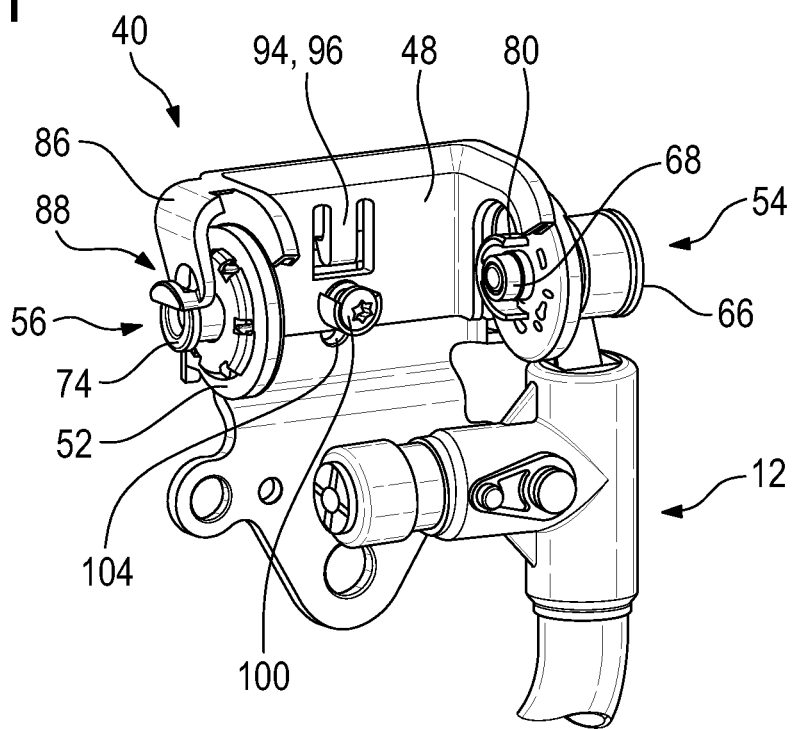
Figure 12:
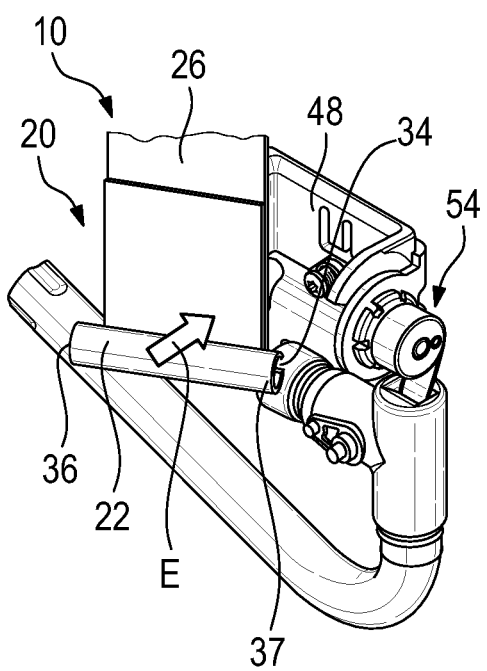
FIGS. 12 to 19 show the belt tensioner according to the invention during different steps of the method for assembling the belt tensioner according to the invention from FIG. 1.
Figure 13:
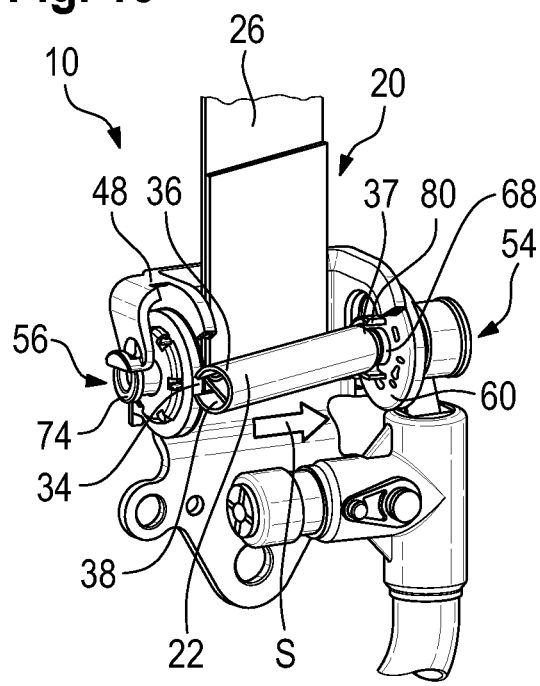
Figure 14:
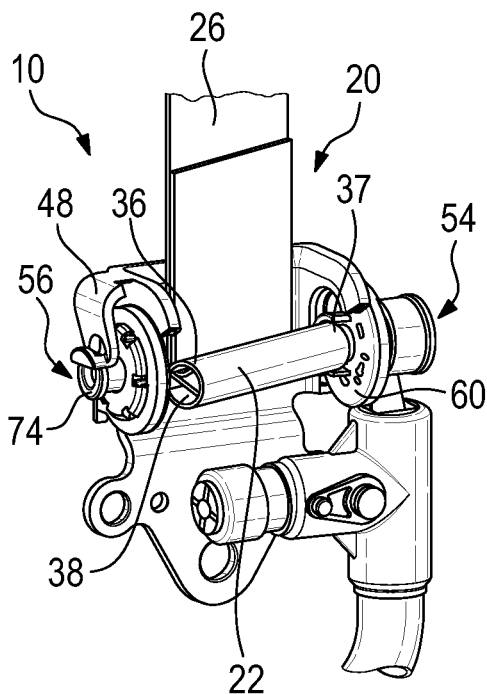

In the home position (see FIGS. 10 and 11) of the belt shaft housing 40, the securing component 48 is located in the assembly position and the fixing element 74 is located in the first position in which the bearing portion 68 of the fixing element 74 does not protrude into the receiving portion 80 of the second coupling unit 56 (see FIG. 10). The opposed bearing portion 68 of the reel 66 extends into the receiving portion 80 of the first coupling unit 54 (see FIG. 11).

The belt shaft 20 is inserted into the belt shaft housing 40 from the front, i.e., from the direction in which the C-shaped receiving portions are opened in the radial direction vis-à-vis the axis of rotation R.

Accordingly, at first an axial end 37 of the axle 22 is coupled to the first coupling unit 54 by attaching the recess 38 of the axial end 37 to the bearing portion 68 of the reel 66 (see FIG. 13) and subsequently sliding it in the sliding direction S up to the stop on the cage disk 60 (see FIG. 14) onto the bearing portion 68 so that the latter is received in the recess 39 of the axle 22.

The axle 22 is aligned such that the slit 34 is opposed to the extension 82 which during sliding thus engages in the slit 34.

The elasticity of the receiving portion 80 and of the bearing portion 68 of the reel 66 is sufficiently high so that the axle 22 can be inserted, although it is not arranged coaxially to the axis of rotation R of the belt shaft housing 40. In addition, or alternatively, sufficient play may be given to enable insertion in this way.

Figure 15:
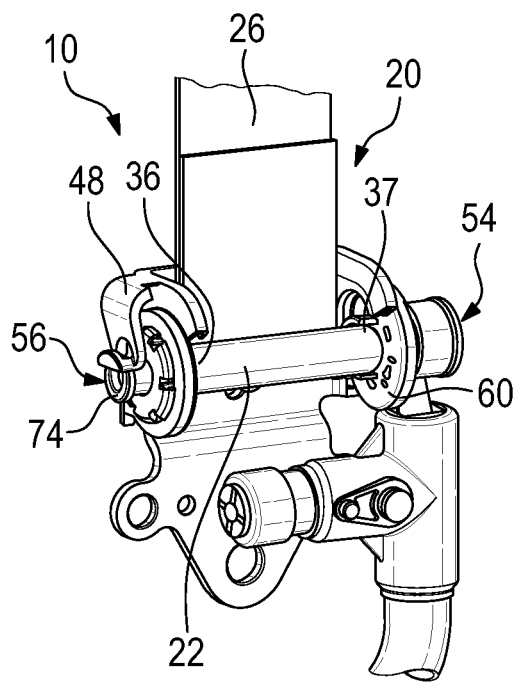
Figure 16:
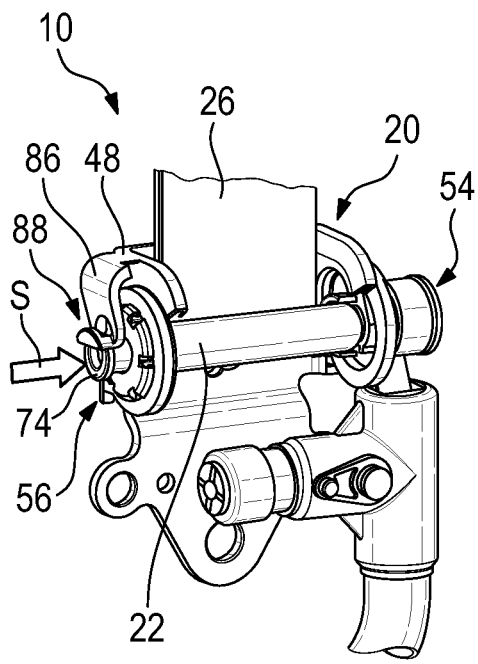
Figure 17:
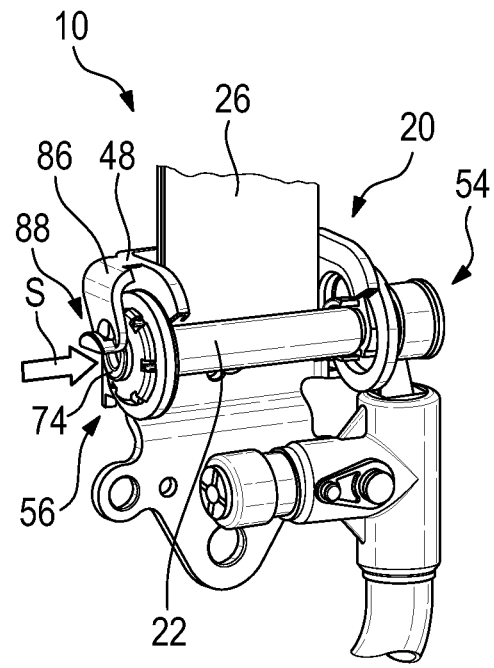
Figure 18:
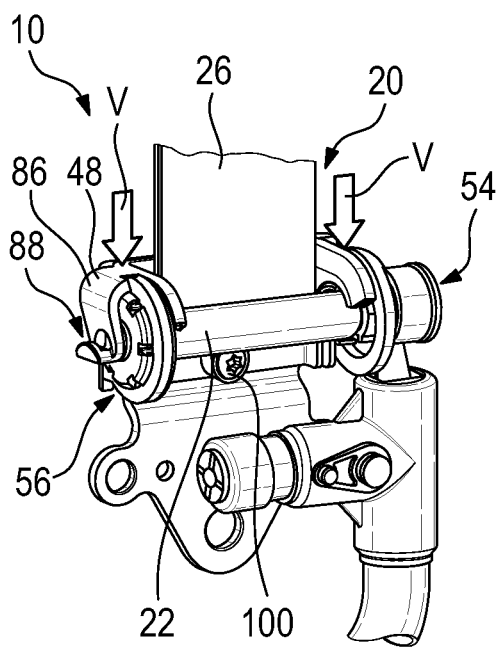
Figure 19:
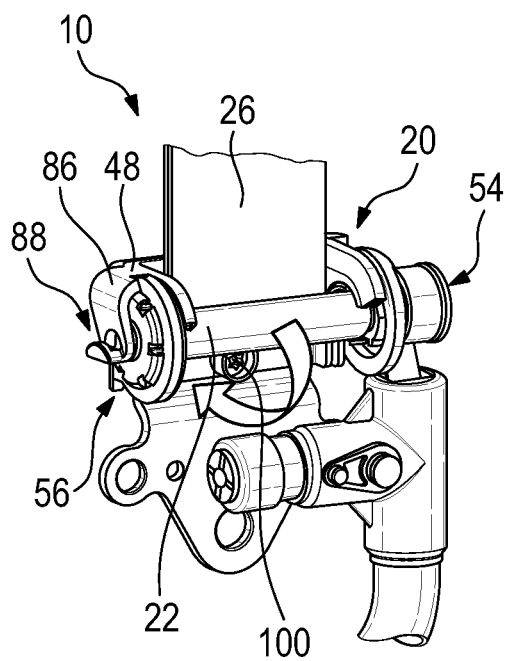

After that, the belt shaft 20 is coupled to the second coupling unit 56 by swiveling the belt shaft 20 into the receiving portion 80 of the second coupling unit 56 until the axle 22 is aligned to be coaxial to the axis of rotation R and the axial end 36 abuts on the receiving portion 80 of the second coupling unit 56 as well as the extension 82 engages in the slit 34 of the axle 22 (see FIG. 15).

In this case, too, the belt shaft housing 40 exhibits sufficient elasticity so that the axle 22 can be swiveled into the second coupling unit 56, even if the axial distance Y between the cage disks 60 (see FIG. 4) corresponds to the axial length L of the axle 22.

After the axle 22 is aligned to be coaxial to the axis of rotation R in this way, the fixing element 74 is adjusted from the first position (see FIG. 16) to the second position (see FIG. 17) and, thus, the bearing portion 68 of the fixing element 74 is inserted into the recess 38 of the axle 22 in the axial direction S.

In so doing, the axle 22 is fixed in the radial and axial directions on the belt shaft housing 40 and is rotatably supported on the latter about the axis of rotation R.

In the next step, the securing component 48 is pressed in the adjusting direction V out of the assembly position into the securing position (see FIG. 18) and, consequently, the fixing element 74 is secured in the second position.

Finally, the securing component 48 is screwed with the shaft holder 42 by means of the fastener 100 (see FIG. 19) and is thus permanently fixed in the securing position.

The torque occurring when the screw 100 is screwed is monitored by a controller (not shown) which safeguards that the assembly has been correctly completed.

In this way, the belt tensioner 10 can be mounted quickly and reliably.

One advantage of the belt tensioner 10 is the easy uncovered assembly from the front, wherein the securing component 48 is pre-fixed by a clip fit and then is secured by additional screwing with torque monitoring.

By the locking of the locking means 94 and the screwing by means of the fastener 100 the axle 22 is efficiently prevented from being unlocked.

Another advantage of the belt tensioner 10 is its simple compact structure.

The invention is not limited to the illustrated and described embodiments. In particular, individual features of one embodiment may be comprised, independently of the other features of the respective embodiment, in another embodiment according to the invention (not shown), i.e., the described features may be combined at will.

In an alternative embodiment, for example the bearing portion 68 of the reel 66 can be adjustable, analogously to the bearing portion 68 of the fixing element 74, between a first position in which the bearing portion 68 substantially does not protrude into the C-shaped receiving portion 80 and a second position in which the bearing portion 68 extends into the C-shaped receiving portion 80. Thus, the reel 66 can adopt the function of the fixing element 74 so that the latter can be fixed in the second position or, resp., can be configured to be not adjustable.

Moreover, in another alternative embodiment, the reel 66 in this way can form a second fixing element that is provided in addition to the fixing element 74, wherein both are adjustable between the first position and the second position. Accordingly, it is possible during assembly to insert the axle 22 in parallel to the axis of rotation R of the belt shaft housing 40, i.e., without having to tilt the axle 22 relative to the axis of rotation R.

The invention claimed is:

1. A belt shaft housing for a belt shaft (20) for a seatbelt system, comprising a shaft holder (42) for holding the belt shaft (20), a securing component (48) having a retaining portion (88), and at least one fixing element (74),
wherein the fixing element (74) is configured to directly engage the belt shaft (20) to fasten the belt shaft (20) in the shaft holder (42),
wherein the securing component (48) is fastened to the shaft holder (42) such that it can adopt an assembly position and a securing position,
wherein the fixing element (74) is released in the assembly position and is secured to the shaft holder (42) in the securing position.

2. The belt shaft housing according to claim 1, wherein the securing component (48) is adjustable from the assembly position into the securing position in a direction (V) transversely to the provided axis of rotation (R) of the belt shaft (20).

3. The belt shaft housing according to claim 1, wherein the fixing element (74) extends coaxially to the axis of rotation (R).

4. The belt shaft housing according to claim 1, wherein the shaft holder (42) includes a first coupling unit (54) and a second coupling unit (56) opposed in the axial direction, wherein the ends (36, 37) of the belt shaft (20) are supported in the coupling units (54, 56), wherein the at least one fixing element (74) fastens one of the ends (36, 37) of the belt shaft (20) in the respective coupling unit (54, 56).

5. The belt shaft housing according to claim 4, wherein the first coupling unit (54) and/or the second coupling unit (56) includes an opening (78) in which the fixing element (74) is at least partially disposed, wherein the securing component (48) at least partially closes the opening (78) in the securing position.

6. The belt shaft housing according to claim 1, wherein the belt shaft housing (40) comprises a fastener (100) by means of which the securing component (48) can be fixed to the shaft holder (42) in the securing position.

7. The belt shaft housing according to claim 1, wherein the shaft holder (42) and the securing component (48) comprise locking means (94) by which the securing component (48) can be locked to the shaft holder (42) in the assembly position and/or the securing position.

8. A belt tensioner, comprising the belt shaft housing according to claim 1, a webbing (26), a belt pin (24) and a sleeve-shaped axle (22) having a C-profile, wherein the axle (22) includes a radially inner surface and a radially outer surface, the axle (22) being solid between radially inner and outer surfaces, wherein at one end (30) of the webbing (26) a loop (32) is formed through which the belt pin (24) extends at least in portions, and wherein the loop (32) is received with the belt pin (24) in a channel defined by the radially inner surface of the axle (22).

9. The belt tensioner according to claim 8, wherein the axial length (l) of the belt pin (24) is smaller than the axial length (L) of the sleeve-shaped axle (22), wherein the belt pin (24) is completely received in the axle (22).

10. A belt tensioner, comprising a belt shaft housing (40) according to claim 4 and a belt shaft comprising a webbing (26), a belt pin (24) and a sleeve-shaped axle (22) having a C-profile, wherein at one end (30) of the webbing (26) a loop (32) is formed through which the belt pin (24) extends at least in portions, and wherein the loop (32) is received with the belt pin (24) in the axle (22), wherein the belt shaft (20) is received in the shaft holder (42) and is fastened by means of the fixing element (74).

11. The belt tensioner according to claim 10, wherein the first coupling unit (54) and/or the second coupling unit (56) include(s) a C-shaped receiving portion (80) which is configured to be complementary to the sleeve-shaped axle (22) of the belt shaft (20).

12. The belt tensioner according to claim 11, wherein the receiving portion (80) includes a radially inwardly extending extension (82) which engages in the sleeve-shaped axle (22).

13. A method for assembling a belt tensioner (10) according to claim 10, comprising the following sequence of steps:
   a) providing the shaft holder (42) including the securing component (48) that is located in the assembly position,
   b) inserting the belt shaft (20) into the shaft holder (42),
   c) inserting the fixing element (74) in the axial direction (S) into the sleeve-shaped axle of the belt shaft (20), and
   d) moving the securing component (48) from the assembly position to the securing position.

14. The method according to claim 13, wherein, after moving the securing component (48) to the securing position, the securing component (48) is fixed to the shaft holder (42) by means of a fastener (100).

15. The method according to claim 14, wherein the fixation by means of the fastener (100) is carried out in a load-monitored manner.

16. The belt shaft housing according to claim 1, wherein the fixing element (74) directly engages the belt shaft (20) inside the belt shaft (20).

17. A belt shaft housing for a belt shaft (20) for a seatbelt system, the belt shaft housing comprising:
   a shaft holder (42) for holding the belt shaft (20);
   a securing component (48) fastened to the shaft holder (42) and moveable between an assembly position and a securing position, the securing component (48) and the shaft holder (42) comprising locking means (94) for locking the securing component (48) to the shaft holder (42) in the assembly position and/or in the securing position; and
   at least one fixing element (74) configured to fasten the belt shaft (20) in the shaft holder (42), the fixing element (74) being released in the assembly position and secured to the shaft holder (42) in the securing position.

18. The belt shaft housing according to claim 17, wherein the securing component (48) is adjustable from the assembly position into the securing position in a direction (V) transversely to the provided axis of rotation (R) of the belt shaft (20).

19. A belt tensioner, comprising:
   a belt shaft housing (40) according to claim 17; and
   a belt shaft including a webbing (26), a belt pin (24) and a sleeve-shaped axle (22) having a C-profile, one end (30) of the webbing (26) having a loop (32) through which the belt pin (24) extends at least in portions, the loop (32) being received with the belt pin (24) in the axle (22), the belt shaft (20) being received in the shaft holder (42) and fastened by means of the fixing element (74).

* * * * *